United States Patent
Fueslein et al.

[15] 3,693,724
[45] Sept. 26, 1972

[54] MECHANISM FOR FOLDING AND LOCKING DISK HARROW GANGS

[72] Inventors: Jerome L. Fueslein; Fred R. Andrews, both of Stockton, Calif.

[73] Assignee: International Harvester Company, Chicago, Ill.

[22] Filed: July 17, 1970

[21] Appl. No.: 55,800

[52] U.S. Cl. .................... 172/456, 172/568, 16/146
[51] Int. Cl. ....................... A01b 63/32, A01b 65/02
[58] Field of Search......172/311, 456, 568, 572, 582, 172/600; 16/147; 280/507, 515, 412; 244/49; 92/14; 296/35 A; 49/199

[56] References Cited

UNITED STATES PATENTS

| | | |
|---|---|---|
| 3,186,494 | 6/1965 | Jackson......................172/311 |
| 3,428,333 | 2/1969 | Nelson.........................172/456 |
| 2,974,738 | 3/1961 | Walberg......................172/568 |
| 3,506,073 | 4/1970 | Walberg......................172/568 |
| 3,568,777 | 3/1971 | Hook...........................172/311 |
| 2,260,080 | 10/1941 | Lane.............................49/199 |
| 2,719,682 | 10/1955 | Handel.........................244/49 |
| 1,404,544 | 1/1922 | Rettig..........................172/456 |
| 1,308,938 | 7/1919 | Donovan....................172/568 |

*Primary Examiner*—Robert E. Pulfrey
*Assistant Examiner*—C. W. Hanor
*Attorney*—Floyd B. Harman

[57] ABSTRACT

A folding wing disk harrow has a double ended hydraulic cylinder which is connected to wings at opposite ends of a central section and which automatically actuates latches to lock the wings in their extended operating position and to release the latches when the wings are to be folded.

3 Claims, 4 Drawing Figures

PATENTED SEP 26 1972 3,693,724
SHEET 1 OF 2
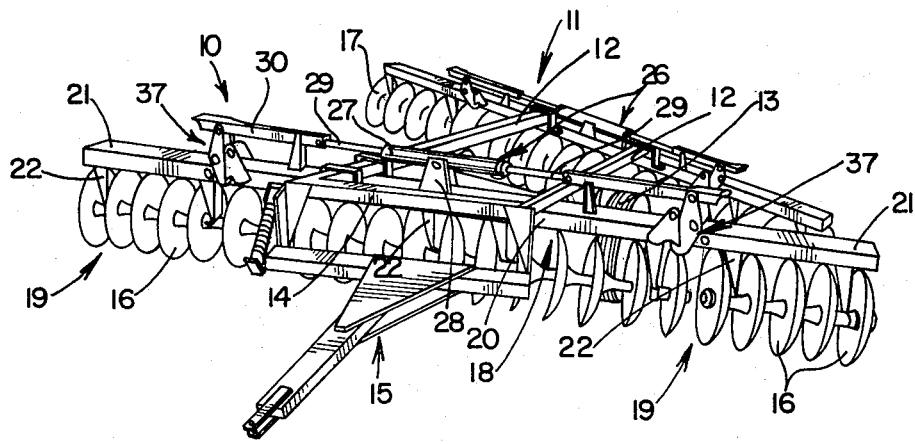
Fig-1-
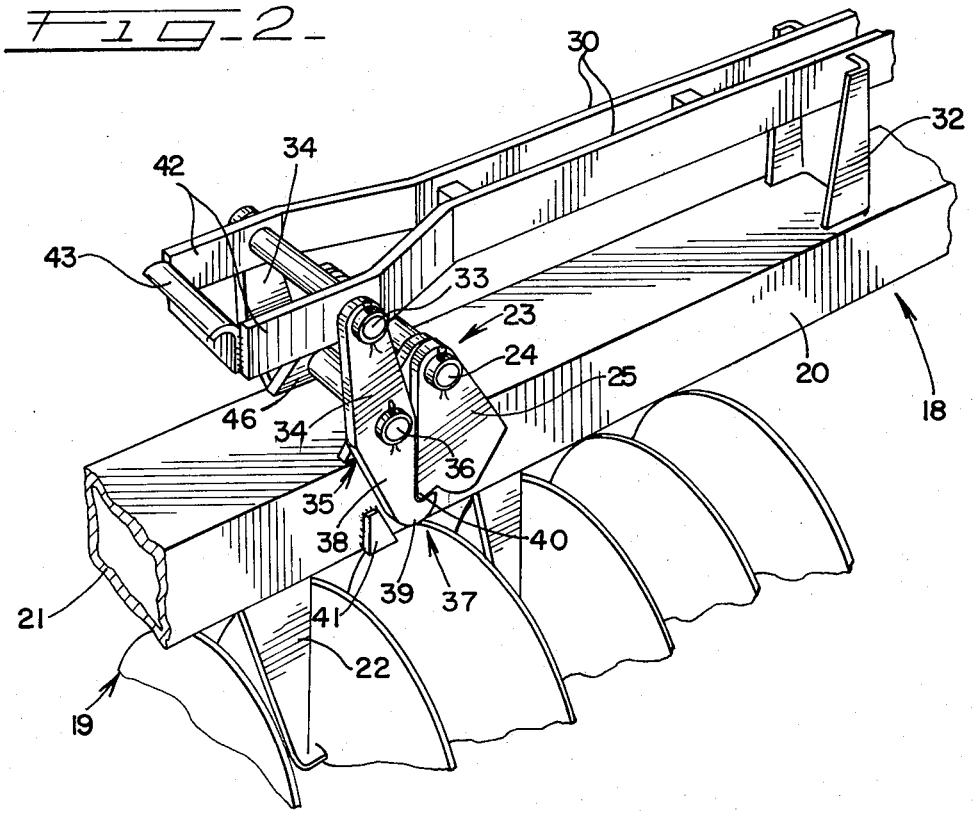
Fig-2-
INVENTORS
JEROME L. FUESLEIN
FRED R. ANDREWS
BY ATT'Y.

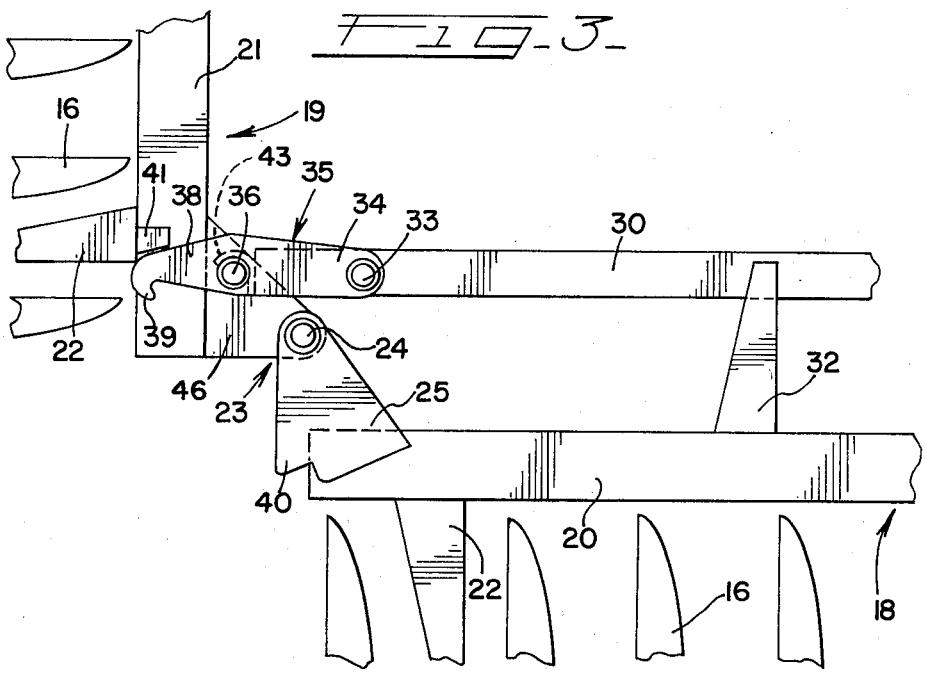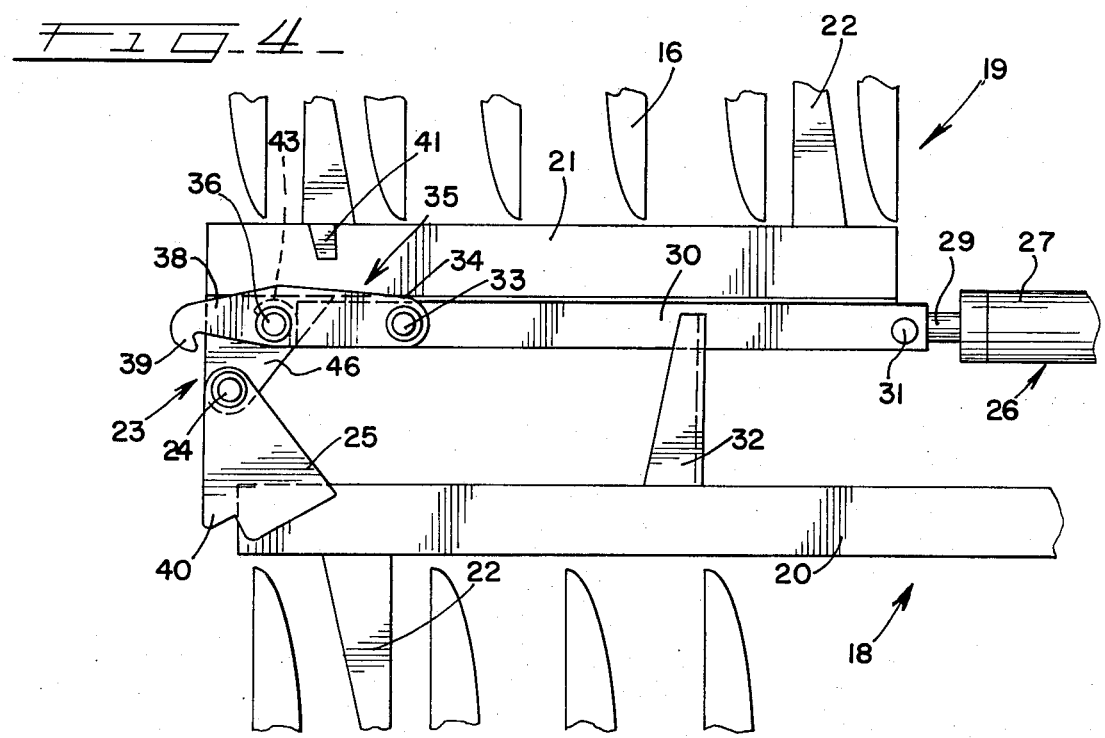

MECHANISM FOR FOLDING AND LOCKING DISK HARROW GANGS

BACKGROUND OF THE INVENTION

This invention relates to agricultural implements and particularly to implements having extension wings. More specifically, the invention concerns a winged implement and means for folding the wings and for locking them in their extended operating position.

The trend toward more powerful tractors has accompanied the need for heavier and wider implements to cover greater areas, and in implements such as disk harrows and the like the additional width required has magnified transport and storage problems, so that it has become customary to increase the working width by hinging to a main disk gang section a pair of extension wings which can be swung about the axis of the hinge to a folded position within the lateral confines of the main or center section. While the use of foldable wings has facilitated passage of the implement through gates and over roads as well as storage of the implement, the folding and unfolding of the heavy wings have been time consuming and have required the expenditure of considerable manual labor. While helper springs have proved useful, the operations of manually folding and unfolding the wings have been hazardous. Furthermore, in order for the earth working tools of an implement wing section to operate uniformly with those of the main or central section, it has been necessary to securely lock the wing section in its operating position. Manual operation of such locking means has meant that the locking means must be disabled when the wings are to be folded and reactivated when the wings are returned to the operating position. A requirement of such locking means is that it maintain the wing sections rigid with the main or central section so that the disks or other tools of the wing section penetrate the ground at the same depth as those of the central section.

An important object of the present invention is the provision of an improved implement of the folding wing type wherein folding and unfolding of the wings is accomplished without manual intervention.

Another object of the invention is the provision, in a winged implement such as a disk harrow, of novel latch means effective in the operating position to lock the wings rigidly to the central section.

Another object of the invention is the provision, in a folding wing implement, of a double ended hydraulic cylinder mounted on the main frame section and connected to the wings for simultaneously folding or unfolding the wings in response to the extension and retraction strokes of the piston rods in the opposite ends of the cylinder.

A further object of the invention is the provision, in a folding wing implement operated by the extension and retraction strokes of a hydraulic cylinder, of novel means for locking the wing section to the center section wherein the first part of the stroke of the cylinder is utilized to unlatch the wing section and the remainder of the stroke functions to move the wing to its folded or inoperative position, and wherein, upon return of the wing to its operating position the last part of the cylinder stroke moves the latch to its locked position with respect to the central section.

DESCRIPTION OF THE DRAWINGS

FIG. 1 is a perspective view of an offset disk harrow incorporating the features of this invention;

FIG. 2 is an enlarged detail in perspective of a portion of the structure of FIG. 1 and showing the position of the latch parts for one of the wings with the latter in its operating position;

FIG. 3 is an enlarged detail in front elevation of a portion of the center disk gang section and one of the wing sections hinged thereto with the wing section shown in a raised or partially folded position; and FIG. 4 is a view similar to FIG. 3 illustrating the fully folded position of the wing section with the latter disposed above and parallel to the central section.

DESCRIPTION OF THE PREFERRED EMBODIMENT

While the implement shown and described is an offset disk harrow, it should be understood that the invention is also applicable to other kinds of winged implements. Front and rear disk gangs 10 and 11 are mounted in well known manner for relative angling on frame members 12 carried by two or more supporting wheels 13, a cross bar 14 joining the forward ends of frame members 12 having connected thereto a hitch structure 15 for attachment of the implement to a tractor, not shown. It is to be understood that the tractor may be of any well known type having a source of fluid under pressure and valve means under control of the tractor operator for directing the flow of fluid.

Disk gangs !0 and 11 are substantial duplicates, the concave faces of the disks 16 of the front gang, however, being directed to the right of the direction of travel while the disks 17 of the rear gang face to the left. Forward gang 10 includes a central section 18 and extension or wing sections 19 at each end thereof, shown in FIGS. 1 and 2 in their extended or operating position.

Central section 18 comprises a transverse member in the form of a rectangular beam 20, and each of the wing sections 19 comprises an extension beam 21, each of said central and wing sections carrying a gang of the disks 16 suspended from beams 20 and 21 by hangers 22.

Hinge means 23 pivotally connect each of the wing sections 19 to the central section 18, and as shown in detail in FIGS. 2 to 4, each hinge means includes a hinge pin 24 the ends of which are supported in hinge brackets 25 affixed to opposite sides of beam 20 of central section 18 and projecting upwardly therefrom, the brackets 25 at one end of central section 18 being the reverse of those at the other. Lugs 26 are affixed to wing beam 21 and are pivotally mounted at their upper ends on hinge pin 24 to accommodate swinging of the wing carried at the end of one arm 34 of a rockable latch member or lever 35 pivoted medially of its ends on a pin 36 mounted between the lower portions of lugs 46 and overcenter outwardly with respect to the axis of hinge pin 24.

Latch member 35 forms part of a latch means generally indicated at 37 in FIGS. 1 and 2. Another arm 38 of member 35 is formed at its end into a hook 39 operatively engageable in the extended operating position of the wing with a mating latch part 40 formed on bracket 25 to lock the wing in its operating position with piston rod 29 extended to exert a counterclockwise force against the latch member 35.

To raise the wing and swing it about the axis of hinge pin 24, piston rod 29 is retracted. As will be evident from FIGS. 1 and 2 the connection of the rockable latch member 35 with the wing beam 21 includes lost motion, the latch member being rockable through a limited range from cooperative engagement of hook 39 with latch part 40 until arm 38 engages a stop 41 affixed to wing beam 21 prior to the initiation of the swinging of the wing section to its folded position. Thus, the first part of the retraction stroke of piston rod 29 releases the latch means 37 and the balance of the stroke is utilized to swing the wing section to the position of FIG. 4.

Upon engagement of arm 38 with stop 41, continued retraction of piston rod 29 in cylinder 27 swings the wing section to the vertical position of FIG. 3. In this position latch member 35 has swung clockwise section from the extended operating position of FIGS. 1 and 2 in alignment with central section 18, through the right angled raised position of FIG. 3 to the fully folded inoperative position of FIG. 4 with the wing beam 21 above and parallel to central beam 20.

Simultaneous folding and unfolding of wing sections 19 is accomplished by power operated extensible and retractable means in the form of a double ended hydraulic ram 26 comprising a cylinder 27 mounted between lugs 28 affixed to central beam 20 and having piston rods 29 slidable in opposite ends thereof to provide retraction strokes to simultaneously fold the wings and extension strokes to return them to their operating position, fluid under pressure for this purpose being supplied to the cylinder in a manner well known in the art from the tractor source. A similar cylinder and piston assembly is mounted on the rear gang 11 for operating the wings and may be separately actuated by the tractor operator, or suitable means, not shown, may connect the cylinders for supplying them with fluid for simultaneous operation.

With particular reference to FIGS. 2 to 4, it will be observed that connecting means having lost motion is provided between piston rod 29 and wing section 19 including a double bar link 30 pivoted at one end on a pin 31 carried at the end of piston rod 29. Link 30 is maintained in vertically spaced relation to central beam 20 and held against horizontal displacement between the arms of a U-shaped bracket 32 affixed to beam 20, and near its outer end is connected to a pivot pin 33 about its pivot axis 36 to a horizontal position in alignment with link 30. Also, in this position arm 38 is still in engagement with stop 41, and an outer extension 42 of link 30 projecting beyond pivot pin 33 has affixed to its end a curved stop 43 which has moved into engagement with pin 36, with link 30 and member 35 in alignment to prevent further pivotal movement therebetween in one direction. From the position of FIG. 3, further retraction of the piston rod effects further clockwise movement of the wing section and a controlled lowering of the wing to its fully folded inoperative position as shown in FIG. 4, stop member 41 moving away from latch member 35 and pin 36 moving overcenter inwardly with respect to the axis of hinge pin 24.

Folding the wing sections of both front and rear gangs 10 and 11 simultaneously is achieved by the concerted actuation of the hydraulic cylinders for both gangs. Return of the wings to their operating position is effected by the extension stroke of rod 29, the wing section 19 swinging counterclockwise about the axis of hinge pin 24 from the folded position of FIG. 4, through the half way position of FIG. 3 to the lowered operating position of FIG. 2. This is accomplished by the first part of the extension stroke of the piston rod until the wing section is in alignment with the central section. In this position arm 38 of latch member 35 is still in engagement with stop 41, and the last part of the stroke of the piston rod continues to pivot the latch member until hook 39 is locked to latch part 40.

It is believed that the construction and operation of the folding and locking mechanism for the wings of a disk harrow will be clearly understood from the foregoing description. However, it should be likewise understood that while the invention has been described in its relation to a disk harrow it is also applicable to other types of folding wing implements.

What is claimed is:

1. In an implement including a central section having a latch part thereon and a wing section, hinge means pivotally connecting said wing section on said central section such that said sections are aligned in the operative position and said wing section folds upon said center section in the stored inoperative position, a latch member pivotally mounted on said wing section by a pivot pin such that it swings within a plane, said latch member including latch means at one end for engagement with a latch part carried by said central section when said sections are in the operative position, a two-way hydraulic jack mounted on said central section and including a piston rod extending therefrom, linkage means operatively connecting the other end of said latch member to the free end of said piston rod, a stop carried by said wing section located in the plane of said latch member such that, when said sections are in the operative position, upon actuation of said hydraulic jack in one direction said latch member first swings to release said latch means from said latch part, said latch member then engages said stop and upon further actuation in said one direction said wing section is pivoted up about said hinge means, said linkage means includes an outer extension extending beyond the connection between said linkage and the other end of said latch member, a second stop carried by said outer extension, said second stop located such that it will engage the pivot pin once the latch member and said linkage means are aligned to thus prevent further pivotable movement therebetween in one direction.

2. The invention as set forth in claim 1 wherein a wing section is hingedly connected to each end of said central section and said hydraulic jack is a double-ended hydraulic cylinder having a piston rod slidable in each end and operatively connected to the respective of said wing sections for simultaneously swinging said wing sections relative to said central section between said operating and folded positions.

3. In an implement including a central section having latch parts thereon and a pair of wing sections, hinge means pivotally connecting said wing sections to opposite ends of said central section such that said sections are aligned in the operative position and said wing sections fold upon said center section in the stored inoperative position, a latch member pivotally mounted on each of said wing sections by pivot pins such that it swings within a plane, said latch members including latch means at one end for engagement with the corresponding latch part carried by said central section when said sections are in the operative position, a two-way double-ended hydraulic cylinder mounted on said central section and including piston rods slidable in and extending from each end thereof, linkage means operatively connecting the other end of said latch members to the free ends of said piston rods, stops carried by said wing sections located in the planes of said latch members such that, when said sections are in the operative position, upon actuation of said hydraulic cylinder in one direction said latch members first swing to release said latch means from said latch parts, said latch members then engage said stops and upon further actuation in said one direction said wing sections are pivoted up about said hinge means.

* * * * *